United States Patent [19]
Brady

[11] Patent Number: 5,143,555
[45] Date of Patent: Sep. 1, 1992

[54] TRAVELLING DOCTOR BLADE

[75] Inventor: C. Lamar Brady, Selma, Ala.

[73] Assignee: International Paper Company, Purchase, N.Y.

[21] Appl. No.: 726,713

[22] Filed: Jul. 1, 1991

Related U.S. Application Data

[63] Continuation of Ser. No. 482,610, Feb. 21, 1990, abandoned.

[51] Int. Cl.$^5$ .............. B01D 24/44; B01D 24/46; B01D 29/62; B01D 33/06
[52] U.S. Cl. .................... 134/42; 210/334; 210/376; 210/784; 210/396; 210/402; 210/791; 15/256.53
[58] Field of Search ............... 210/402, 396, 791, 376, 210/334, 784; 134/42, 33; 15/256.53

[56] References Cited

U.S. PATENT DOCUMENTS

| | | | |
|---|---|---|---|
| 1,922,959 | 8/1933 | Kerst | 425/223 |
| 2,138,476 | 11/1938 | Jones | 210/376 |
| 2,857,612 | 10/1958 | Fischer . | |
| 2,894,634 | 7/1959 | Lepoutre | 210/375 |
| 2,997,176 | 8/1961 | Delmas | 134/33 |
| 3,520,410 | 7/1970 | Hutto, Jr. | 210/396 |
| 3,688,337 | 9/1972 | Noda | 210/376 |
| 3,740,789 | 6/1973 | Ticknor | 15/256.53 |
| 3,814,260 | 6/1974 | Daubman et al. | 210/402 |
| 3,863,453 | 2/1975 | Mercier | 15/256.53 |
| 3,869,389 | 3/1975 | Rokitansky | 210/402 |
| 4,019,217 | 4/1977 | Schinke | 15/256.53 |
| 4,146,484 | 3/1979 | Campbell | 210/402 |
| 4,273,655 | 6/1981 | Reid | 210/402 |
| 4,836,917 | 6/1989 | Tomita et al. | 210/396 |

FOREIGN PATENT DOCUMENTS 559827 7/1958 Canada .
968638 9/1964 United Kingdom .

Primary Examiner—Theodore Morris
Assistant Examiner—Zeinab El-Arini
Attorney, Agent, or Firm—Walt Thomas Zielinski; Michael J. Doyle

[57] ABSTRACT

A method and apparatus for doctoring (cutting) the solids off a precoat filter. A stationary doctor blade continuously doctors mud (from a mud bath) from the surface of a rotating porous surface vacuum drum. A traveling doctor blade, located upstream of the stationary doctor blade, moves back and forth along the drum. The stationary blade extends the width of the rotating vacuum drum while the traveling blade is shorter and is also located nearer to the drum surface.

8 Claims, 3 Drawing Sheets

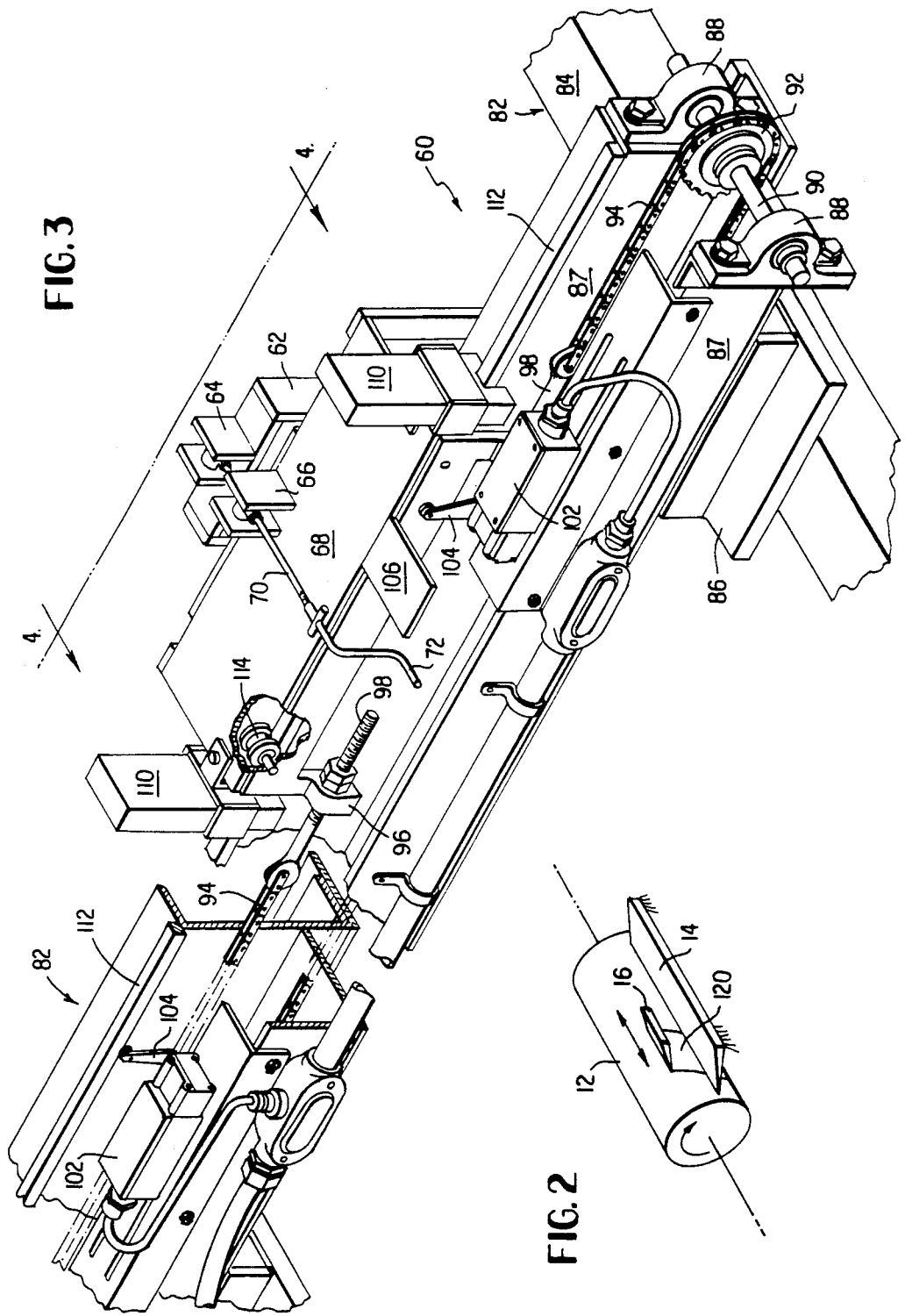

TRAVELLING DOCTOR BLADE

This is a continuation of application Ser. No. 07/482,610, filed Feb. 21, 1990, now abandoned.

BACKGROUND OF THE INVENTION

This invention relates to a doctor blade construction for continuously removing a mud coat from a rotating vacuum drum. The lower portion of the drum is immersed in a bath, the mud containing calcium carbonate which is to be recovered from a mud slurry. The mud is continuously removed from the rotating drum by a doctor blade, with removed mud then passing to a conveyor for further treatment in a lime kiln. In one prior method of recovery, a blade which covered the width of a vacuum drum was advanced toward the drum over a fixed period, typically 10 to 15 minutes. After the blade reached its nearest position to the drum surface, it retracted to its outermost position, with the cycle then repeating. Since the blade was not continuously cutting mud from the vacuum drum surface, the feed to a lime kiln stopped during this time. This introduced a large variation in feed to the lime kiln.

The art is aware of constructions and methods somewhat similar to that of the present invention, such as shown in U.S. Pat. No. 2,857,612 issued to Fisher and U.S. Pat. No. 3,688,337 issued to Noda.

SUMMARY OF THE INVENTION

According to the practice of this invention, a conventional rotating vacuum drum is continuously scraped over its width by a stationary doctor blade and a travelling doctor blade is provided which is continuously reciprocated in a horizontal plane back and forth over the width of the drum. The reciprocating blade is located upstream of the stationary blade, so that it contacts the mud layer prior to the stationary blade contacting the latter. The travelling doctor blade is positioned closer to the drum surface than the stationary blade. This permits the travelling doctor blade to doctor off the fine particle solids in the mud slurry before they reach the drum surface. Should fine particles reach the drum surface, they will blind over the drum. When the drum is blinded over, it is necessary to break the vacuum on the drum, remove the existing cake and precoat the drum again.

BRIEF DESCRIPTION OF THE DRAWINGS

FIG. 2 is a partially schematic view illustrating that portion of FIG. 1 to which the invention more particularly relates.

FIG. 3 is a partially broken perspective view of a portion of the apparatus of this invention which oscillates the travelling doctor blade back and forth across the drum width.

DETAILED DESCRIPTION OF THE INVENTION

Figure 1:
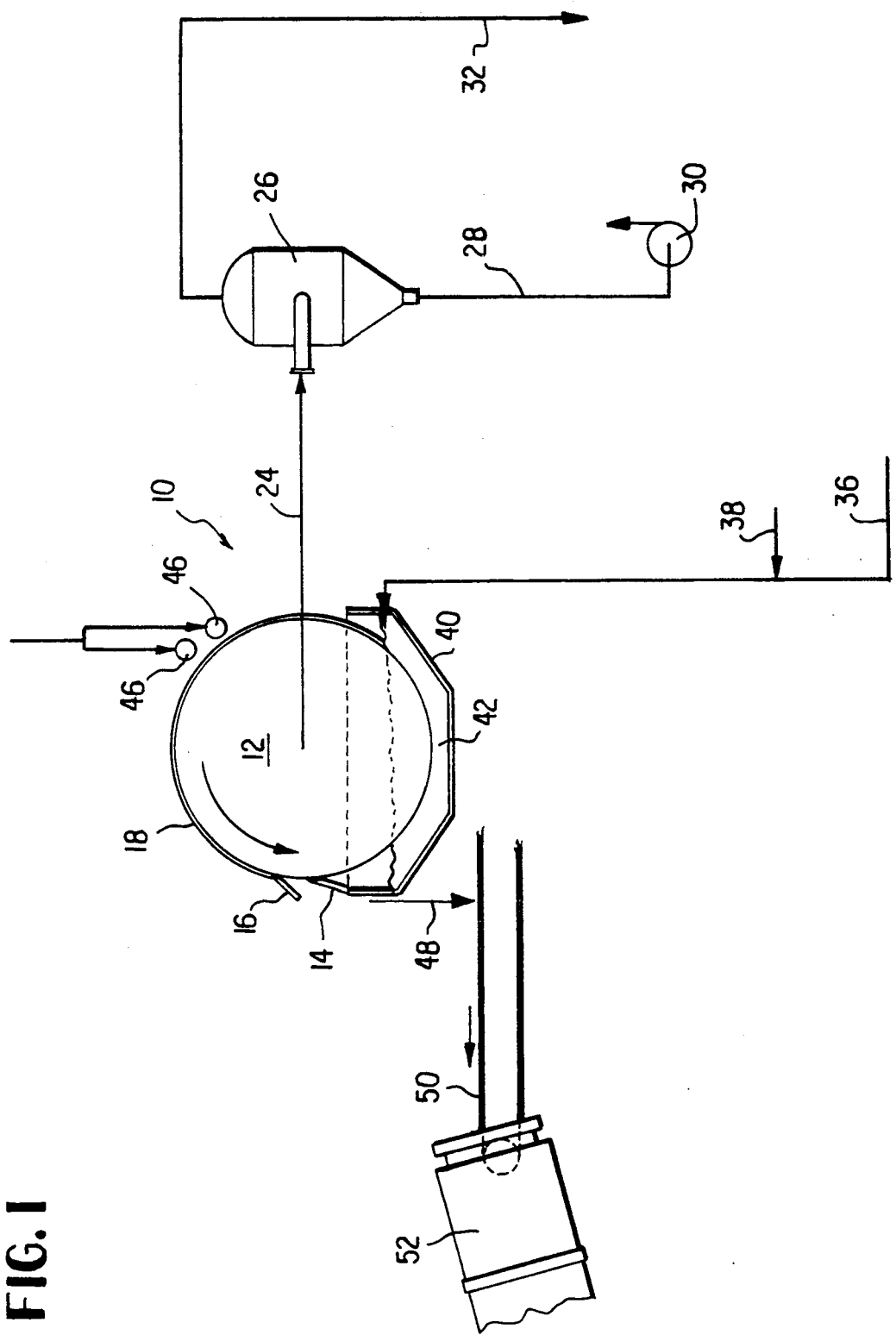
FIG. 1 is partially schematic view illustrating the environment in which the present invention operates.

Referring now to FIGS. 1 and 2 of the drawings, the numeral 10 denotes generally a system or installation in which the present invention is employed. The numeral 12 denotes a vacuum drum having a porous surface and rotatable on a horizontal direction in the indicated direction. A stationary doctor blade 14 spans substantially the entire width of drum 12, with travelling doctor blade 16 spanning a significantly smaller width of the drum. Both blades function to remove a mud coat 18 on the upper, outer surface of drum 12. A vacuum line 24, schematically designated, couples the interior of porous drum 12 to a vacuum receiver 26, with hydraulic line 28 feeding from receiver 28 to a filtrate and wash system by means of a pump 30. Vacuum line 32 is connected to a vacuum pump, not illustrated, and applies vacuum to receiver 26. A mud slurry, containing lime which is to be recovered, is fed from a tank (not illustrated) through line 36 and may be diluted by injected water from line 38. Slurry from line 36 feeds into vat 40 to form a volume of mud slurry 42 in the bottom of the vat or tank. During operation, vacuum from the interior of drum 12 results in a depositing of a layer of mud 18 on the outer surface of the rotating drum, with knives 14 and 16 scraping off the mud. Mud layer 18 may be sprinkled with water to assist washing by means of sprinklers indicated at 46. Mud 48 scraped off of the drum falls onto conveyer 50 and into the input to a lime kiln 52 for further treatment. FIG. 2 illustrates the basic action of the doctor blades and their relation to the drum.

Figure 4:
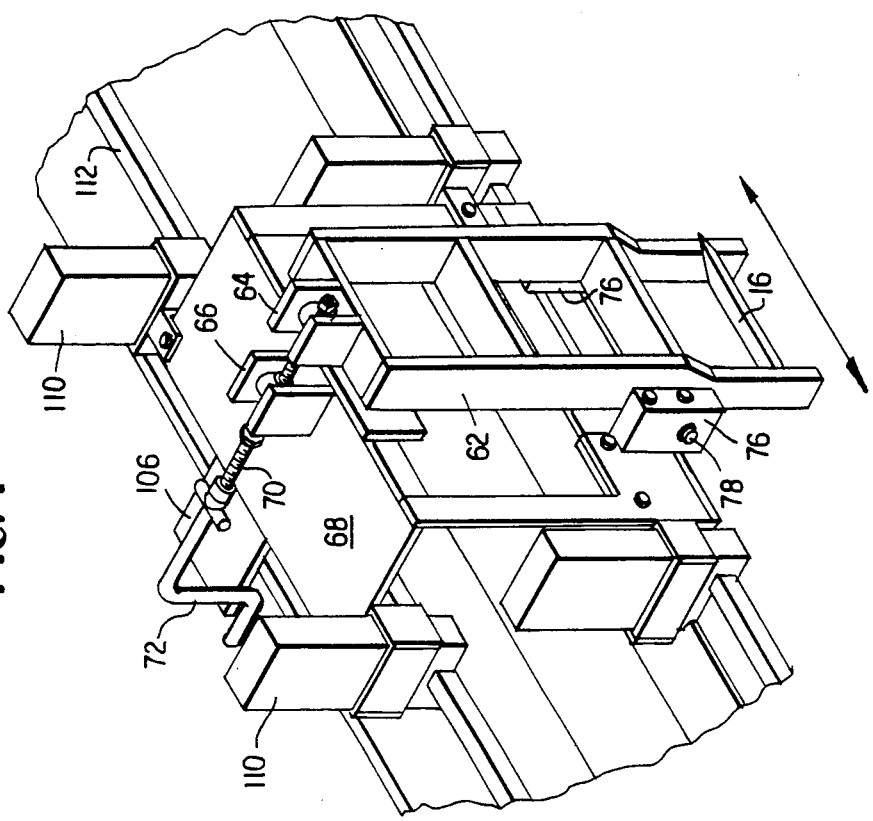
FIG. 4 is a view taken along 4—4 of FIG. 3 and illustrates the travelling doctor blade and its mode of mounting for radial adjustment.

Referring now to FIGS. 3 and 4 of the drawings, 60 denotes generally that portion of the apparatus for holding the travelling doctor blade and for moving it back and forth along the horizontal axis, substantially parallel to the axis of rotation of drum 12. The numeral 62 denotes a generally rectangular frame whose lower legs hold travelling blade 16. The upper portion of frame 62 is provided with a pair of ears 64 which receive an internally threaded member, such as a nut, with a second pair of spaced ears 66, also carrying an internally threaded element between them, mounted on frame portion 68. Threaded rod 70 passes through the internally threaded elements between the respective pairs of ears 64 and 66 and is coupled to handle 72. A pair of blocks 76, attached to frame portion 68, carry pivot pin 78. Rotation of handle 72 causes a rocking action of frame 62 about pivot axis 78 to thereby move blade 16 towards and away from the surface of drum 12, for adjustment of the distance therefrom. Frame portion 84 of the apparatus supports a plate 86, the latter carrying elongated brackets 87 which support a pair of bearings 88. Shaft 90 is journaled in the bearings, with sprocket wheel 92 keyed to the shaft, and sprocket wheel 92 driven by flexible chain 94. The left hand portion of chain 94 passes around a similar sprocket wheel to the left of the apparatus shown at FIG. 3, this sprocket wheel being driven by a reversible electric motor, not illustrated.

Reciprocating frame portion 68 carries a pair of apertured brackets 96, only one of which is illustrated, with threaded rods 98 passing therethrough and attached to a respective end of chain 94. Two reversing switches 102 each carry a respective arm 104. With actuation of the electric motor, frame 68 moves in one direction until abutment plate 106 thereon hits one of the two arms 104. This causes electric current direction in the motor to reverse and thereby reverse the direction of motion of frame 68 and travelling blade 16. Frame portion 68 is provided with a pair of spaced guides 110 which contact rail 112, with frame portion 68 provided with rollers 114, only one of which is illustrated, which also contact rail 112.

Figure 5:
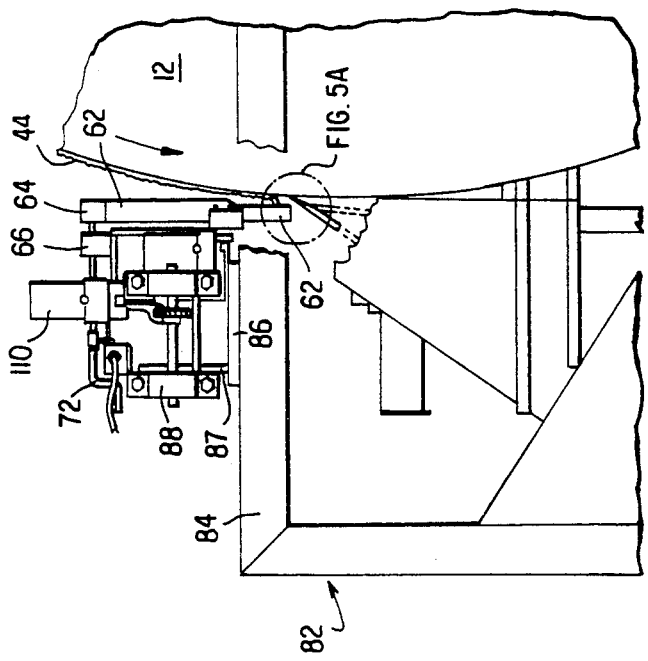
FIG. 5 is a partial end view showing the relationship of the apparatus of FIGS. 3 and 4 to a rotating vacuum drum.
Figure 5A:
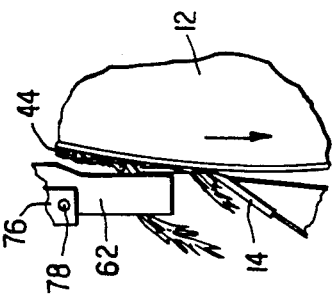
FIG. 5A is an enlarged portion of the indicated part of FIG. 5.

Reference to FIGS. 2 and 5A further illustrates the action. Travelling doctor blade 16, of appreciably less width than that of stationary blade 14 and drum 12 moves back and forth, as indicated at FIG. 2. Because it is closer to the surface of drum 12, it cuts a greater depth of mud layer 18 than blade 14. This is indicated by 120 at FIG. 2. The reader will readily visualize that the back and forth motion of blade 16, cutting deeper than the cut of stationary blade 14, will continuously produce a series of stripes of the width of blade 16, similar to stripes on a common barber pole, and that these stripes will continually overlap as the travelling blade executes motion back and forth from end to end of the vacuum drum. The respective cutting depths of blades 14 and 16, and the speed of drum rotation and the rate of reciprocation of blade 16 will vary, depending upon for example the character of the mud slurry which contains the element, here calcium carbonate, which is to be recovered.

I claim:

1. An apparatus for removing a mud layer fromt e porous surface of a rotating vacuum drum, the apparatus including means for applying a vacuum to the interior of a rotating porous drum, the lower portion of the drum adapted to rotate in a vat having therein a calcium carbonate containing a mud slurry, a first knife positioned along and contiguous to the drum surface, the first knife being stationary and of a length substantially equal to the width of the drum, a second knife positioned along and contiguous to the drum surface, said second knife being of a length less than the width of the drum, means for reciprocating said second knife along the width of the drum means for reciprocating said second knife along the width of the drum from one drum end to the other, said knives both adapted to scrape off a portion only of a mud layer from the drum surface, the second knife adapted to contact and scrape off a portion only of a mud layer on the drum prior to the first knife contacting and scraping off mud on the drum, both knives spaced from the drum surface, said second knife located nearer to the drum surface than the first knife.

2. The apparatus of claim 1 wherein said knives are substantially vertically aligned, the second knife located above the first knife.

3. A method of delivering a calcium carbonate containing mud slurry to a lime kiln, the method including the steps of continuously feeding a calcium carbonate containing mud slurry to a vat having therein a lower portion of a rotating, porous surface vacuum drum, placing the interior of the drum under a vacuum to thereby form a mud layer on the surface of the drum, continuously scraping off a portion less than the entire width of the drum less than the entire thickness of the mud layer on the drum by a second knife reciprocating across the drum, said second knife being of a width less than the width of the drum, transporting the scraped off mud portion from the second knife to a lime kiln, continuously scraping off a portion less than the entire thickness of the remaining mud layer on the drum which has not been scrapped off by said second knife by a stationary, first knife, transporting the scraped off mud portion from the first knife across substantially the entire width of the drum to said lime kiln, said first and second knives spaced from the drum surface, said second knife located nearer to the drum surface than the first knife.

4. The method of claim 3 wherein the second knife contacts the mud layer prior to the first knife contacting the mud layer.

5. The method of claim 18 wherein said first and second knives are substantially vertically aligned, the second knife located above the first knife.

6. A method of removing a mud slurry layer from the porous surface of a rotating drum, the method including the steps of continuously feeding a mud slurry to a vat having therein a lower portion of a rotating, porous surface vacuum drum, placing the interior of the drum under a vacuum to thereby form a mud layer on the surface of the drum, continuously scraping off a portion less than the entire width of the drum less than the entire thickness of the mud layer on the drum by a second knife reciprocating across the drum, said second knife being of a width less than the width of the drum, continuously scraping off a portion less than the entire thickness of the remaining mud layer on the drum which has not been scrapped off by said second knife by a stationary, first knife, across substantially the entire width of the drum said first and second knives spaced from the drum surface than the first knife.

7. The method of claim 6 wherein the second knife contacts the mud layer prior to the first knife contacting the mud layer.

8. The method of claim 7 wherein said first and second knives are substantially vertically aligned, the second knife located above the first knife.

* * * * *